Feb. 12, 1924.
R. Y. BOVEE
1,483,154
SPRING SUSPENSION FOR VEHICLES
Original Filed Jan. 17, 1921　2 Sheets-Sheet 1
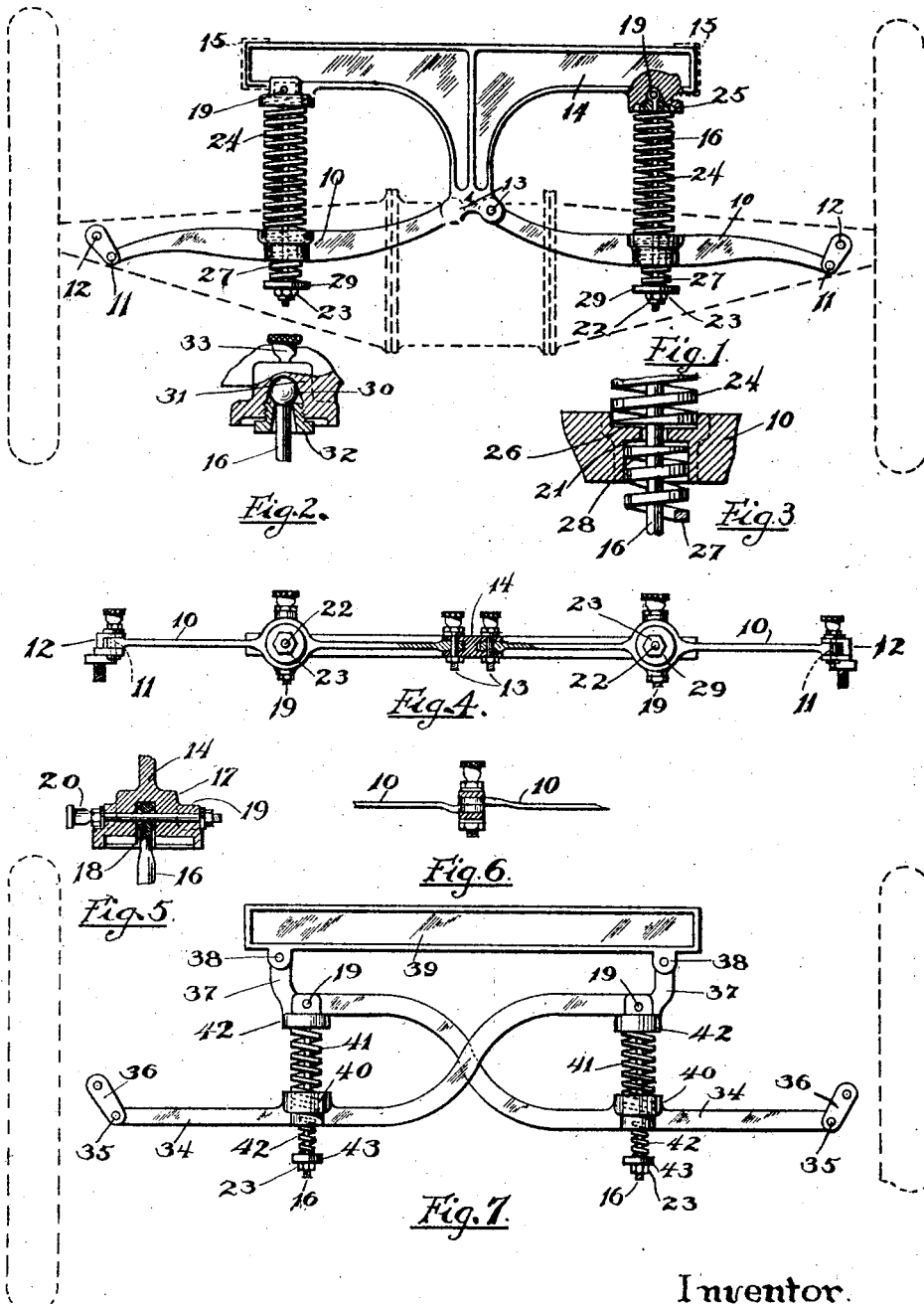
Inventor.
RANSOM Y. BOVEE
atty.

Patented Feb. 12, 1924.

1,483,154

UNITED STATES PATENT OFFICE.

RANSOM Y. BOVEE, OF MAYWOOD, ILLINOIS.

SPRING SUSPENSION FOR VEHICLES.

Application filed January 17, 1921, Serial No. 437,891. Renewed December 31, 1923.

*To all whom it may concern:*

Be it known that I, RANSOM Y. BOVEE, a citizen of the United States, residing at Maywood, in the county of Cook and State of Illinois, have invented certain new and useful Improvements in Spring Suspensions for Vehicles, of which the following is a specification.

This invention relates to improvements in spring suspension for vehicles, particularly adapted, though not necessarily limited in its use with motor vehicles, and one of the objects of the invention is to provide an improved cantilever spring action by means of which the leverage or force applied to the traction wheels will be compounded upon the action of the springs, thereby reducing the amount of spring action in proportion to the vertical movement of the wheels.

A further object is to provide improved means whereby the usual friction of leaf springs which creates sluggishness of action, thereby communicating road shocks through frictional hammer blows, are eliminated and the entire weight of the vehicle body will be borne upon a full, floating, live center spring suspension.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a view partly in elevation and partly broken away of one form of the invention.

Figure 2 is an enlarged view partly in elevation and partly in section of a detail.

Figure 3 is a view partly in elevation and partly in section of a detail.

Figure 4 is a bottom plan view partly in section of the parts shown in Figure 1.

Figure 5 is an enlarged detail sectional view of a knife edge connection between the bolt members and the hanger.

Figure 6 is a modified form of the connection shown in Figure 4.

Figure 7 is a view in elevation of a modified form of the invention.

Figure 8:
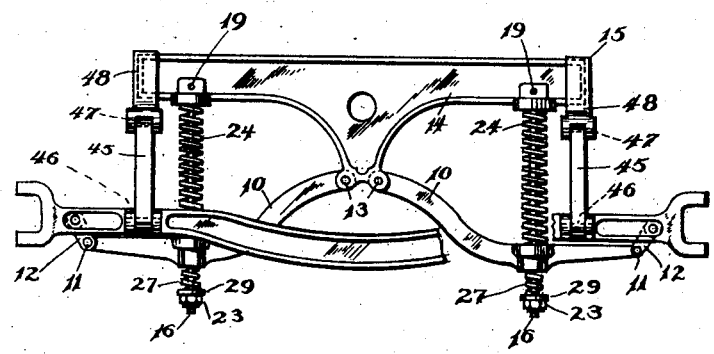
Figure 8 is a front elevation, partly broken away showing this invention as applied to the front axle of a vehicle.

Referring more particularly to the drawings the numeral 10, designates two cantilever suspension members which may be of any desired size and configuration, and are pivotally anchored as at 11, through the medium of a clip 12, to a fixed portion of the vehicle, such as the axle. The inner ends of each of these members 10, are pivotally connected as at 13, to a hanger 14, which in turn is connected with a portion of the chassis 15, of the vehicle.

Pivotally connected with the hanger intermediate the outward suspension limits 11—13, of each of the members 10, is a bolt member 16, which is provided with an eye 17, in one end thereof and a knife edge bearing 18, in the said eye. A pivot bolt or pin 19, passes through a portion of the hanger 14, and also through the eye 17, and if desired a lubricating cup 20, may be provided for supplying lubricant to the pivot thus formed.

This bolt member 16, is of any desired length and passes loosely through an aperture 21, in the suspension member 10, and also extends for any desired distance beneath the member 10, and the extremity 22, is provided with threads adapted to receive a nut or collar 23.

Encompassing the body member 16, between the hanger 14, and the member 10, is a coil spring 24, one end of which rests in a suitable seat or socket 25, formed on the hanger 14, and the other end rests in a suitable seat or socket 26, formed in the member 10, encompassing the opening 21.

Beneath the member 10, is arranged another coil spring 27, one end of which is seated in a suitable socket or recess 28, formed in the lower face of the member 10, and the other end of the spring engages and rests upon a suitable washer 29, which in turn rests upon the nut or collar 23, so that by adjusting the nut or collar 23, upon the bolt member 16, it will be manifest that tension of the springs 24—27, may be varied. Obviously the opening 21, is of a sufficient size to permit of the free action of the bolt member 16, when the member 10, and the hanger 14, are moved relatively one with relation to the other.

One of these constructions of cushioning devices is arranged on each side of the vehicle. The bolt member 16, may be pivotally connected in any suitable manner with the hanger either in the manner as just described or if desired, the bolt member 16, may be provided with a ball head 30, adapted to be seated in a socket or recess 31, and a collar 32, which encompasses the member 16, is adapted to be threaded into the socket 31, to engage the ball 30, on the end thereof. A lubrication cup 33, may be provided for the joint thus formed, if desired.

In Figure 7, there is shown a modified form of the invention in which the suspension members 34, are pivotally anchored as at 35, through the medium of a shackle 36, with a fixed portion of the vehicle. These members 34, extend across each other and to the opposite side of the chassis so that the respective ends 37, of the members may be pivotally connected as at 38, with a hanger 39, the ends 37, of each of the members being disposed intermediate the outward suspension limits 35—38 of the other member.

The members 34, are provided with an opening similar to the opening 21, in the member 10, and surrounding these openings are seats or recesses 40, in which one end of the coil spring 41, rests. A similar socket or seat 42, is provided on the other member 34, in alinement with the seat or socket 40, so as to receive the other end of the spring 41. The bolt member 16, is pivotally connected as at 19, to the adjacent portion of the other of the members 34, so that the coil spring 41, will encompass the bolt member. An additional coil spring 42, similar to the spring 27, is arranged beneath each of the members 34, to rest upon the washer 43, which is held in position by the nut or collar 23.

This form of the invention is particularly adapted for heavy vehicles such as trucks or the like.

Figure 9:
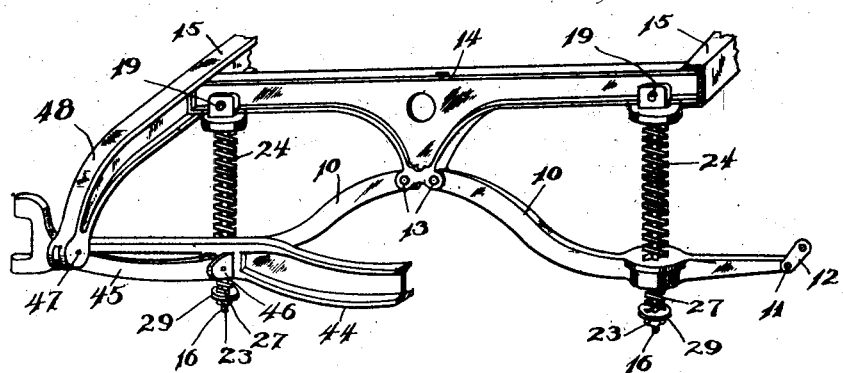
Figure 9 is a view partly in perspective, partly broken away and with parts omitted of the form shown in Figure 8.

In Figures 8 and 9, the spring suspension is of a construction similar to the construction shown in Figure 1, and is shown as applied to the front axle of the vehicle. With this improved construction and by the provision of the cantilever suspension and also by providing the two springs 24—27, one on each side thereof it will be manifest that through the bottom rebound springs 27, the sudden upward flings of the load or body, will have its limits cushioned through the reactionary springs, and which also cushion the upward movements of the body action, and it will also be manifest that with this improved construction the load pressure will be equalized by applying the load between or within the outward suspension limits.

The front axle 44 receives its traction through drag bars 45, which are connected in any suitable manner as at 46, with the axle, and at their other end as at 47, with a forwardly projecting portion 48, of the chassis 15, and which portion 48, extends preferably for a considerable distance in advance of the axle.

While the preferred forms of the invention have been herein shown and described, it is of course to be understood that various changes may be made in the details of constuction, within the scope of the claims, without departing from the spirit of this invention.

What is claimed as new is:—

1. A spring suspension embodying co-operating supporting members, means pivotally anchoring one end of each of the members, a hanger connected with the vehicle and to which hanger the other ends of the said suspension members are pivotally connected, bolt members pivotally connected by one end to the said hanger and passing through and beyond the said supporting members intermediate the outward suspension limits of the latter, and elastic members encompossing the said bolt members on opposite sides of the said supporting members and operating upon the latter and also upon the said hanger.

2. A spring suspension embodying cooperating supporting members, means pivotally anchoring one end of each of the members, a hanger connected with the vehicle and to which hanger the other ends of the said suspension members are pivotally connected, bolt members pivotally connected by one end to the said hanger and passing through and beyond the said supporting members intermediate the outward suspension limits of the latter, and elastic members encompassing the said bolt members on opposite sides of the said supporting members and operating upon the latter and also upon the said hanger, the pivotal connection between the said bolt members and the said hanger being formed by knife edge bearings.

3. A spring suspension for vehicles embodying co-operating supporting members, means pivotally anchoring one end of said members, a hanger to which the other ends of said members are pivotally connected, bolt members pivotally connected by one end with the hanger and passing loosely through and beyond the respective supporting members, a coil spring encompassing each of the bolt members intermediate the hanger and the respective supporting members and bearing against both of them, and an additional coil spring member encompassing the respective bolt members on the side of the supporting members opposite to the side on which the first recited coil springs are located.

4. A spring suspension for vehicles embodying co-operating supporting members, means pivotally anchoring one end of said members, a hanger to which the other ends of said members are pivotally connected, bolt members pivotally connected by one end with the hanger and passing loosely through and beyond the respective supporting members, a coil spring encompassing each of the bolt members intermediate the hanger and the respective supporting members and bearing against both of them, an additional coil spring member encompassing the respective bolt members on the side of the supporting members opposite to the side on which the first recited coil springs are located, and nuts or collars threaded upon the free end of the bolt members whereby the tension of the said coil springs may be varied.

5. A spring suspension for vehicles embodying co-operating supporting members, means pivotally anchoring one end of each of said members, a hanger, the other end of each of the said members being disposed intermediate the ends of the other member and spaced therefrom, means pivotally connecting the said other ends of the members with the hanger, and cushion members between the said supporting members and intermediate the outward suspension limits of the first said members.

6. A spring suspension for vehicles embodying co-operating supporting members, means pivotally anchoring one end of each of said members, a hanger, the other end of each of the said members being disposed intermediate the ends of the other member and spaced therefrom, means pivotally connecting the said other ends of the members with the hanger, bolt members pivotally connected with each of the supporting members and passing through and beyond the other supporting members, and a pair of cushion members encompassing the bolt members on opposite sides of the respective supporting members, one of the cushion members of each pair being disposed between the said supporting members.

7. A spring suspension for vehicles embodying co-operating supporting members, means pivotally anchoring one end of each of the members, a hanger member connected with the vehicle body and to which hanger member the other ends of the said supporting members are pivotally connected, cushion members interposed between the said hanger and the respective supporting members and engaging the latter between the outward suspension limits, the ends of the chassis frame projecting in advance of the vehicle axle, and draw bars connecting the axle with the forward projecting ends of the chassis frame.

In testimony whereof I have signed my name to this specification, on this 11th day of January, A. D. 1921.

RANSOM Y. BOVEE.